(12) United States Patent
Mizoo et al.

(10) Patent No.: US 7,606,418 B2
(45) Date of Patent: Oct. 20, 2009

(54) WRITING ANALYTIC APPARATUS AND WRITING ANALYTIC PROGRAM

(76) Inventors: Keiko Mizoo, 1426-6 Yanagawa-cho, Mito City, Ibaraki 310-0003 (JP); Asahiko Mizoo, Hyakumanben Heights 313, 8-1 Tanaka, Monzen-machi, Sakyo-ku, Kyoto City, Kyoto 606-8225 (JP)

( * ) Notice: Subject to any disclaimer, the term of this patent is extended or adjusted under 35 U.S.C. 154(b) by 512 days.

(21) Appl. No.: 10/868,533

(22) Filed: Jun. 15, 2004

(65) Prior Publication Data

US 2004/0259061 A1    Dec. 23, 2004

(30) Foreign Application Priority Data

Jun. 23, 2003  (JP) ............... 2003-177729

(51) Int. Cl.
G06K 9/34    (2006.01)
G06K 9/00    (2006.01)

(52) U.S. Cl. ............... 382/176; 382/177; 382/181

(58) Field of Classification Search ......... 382/181–189, 382/176–177; 434/162; 707/3; 704/500, 704/1–10
See application file for complete search history.

(56) References Cited

U.S. PATENT DOCUMENTS

| | | | | |
|---|---|---|---|---|
| 5,109,495 | A * | 4/1992 | Fite et al. | 712/207 |
| 5,983,237 | A * | 11/1999 | Jain et al. | 707/104.1 |
| 6,249,765 | B1 * | 6/2001 | Adler et al. | 704/500 |
| 2001/0010714 | A1 * | 8/2001 | Nemoto | 379/88.01 |
| 2001/0030759 | A1 * | 10/2001 | Hayashi et al. | 358/1.9 |
| 2003/0027114 | A1 * | 2/2003 | Sims-Barnes | 434/178 |

FOREIGN PATENT DOCUMENTS

| | | |
|---|---|---|
| JP | 06-325080 | 11/1994 |
| JP | 07-036905 | 2/1995 |

OTHER PUBLICATIONS

"East Text Search Training", U.S. Patent and Trademark Office, Jan. 2000, pp. 6-71.*
Keiko Mizoo "Qualitative and Quantitative Analysis of English Literature", Kiyou, No. 17, 1997, Teikyo Joshi Daigaku, Japan.
Keiko Mizoo "Image Analysis with the Clue of Proper Nouns", Bungakubu Kiyou, No. 28, 1997, Teikyo Daigaku, Japan.
Keiko Mizoo "Image Analysis with the Clue of Words and Phrases Which Repeated Appear", Kiyou, No. 18, 1998, Teikyo Joshi Daigaku, Japan.
Keiko Mizoo "Image Analysis Using the Historical Clue", Bungakubu Kiyou, No. 29, 1998, Teikyo Daigaku, Japan.

* cited by examiner

Primary Examiner—John B Strege
(74) Attorney, Agent, or Firm—Manabu Kanesaka

(57) ABSTRACT

A writing analysis apparatus analyzes a content of a writing, probes into various kinds of images contained in the given writing, etc., in a time series manner. The writing analytic apparatus includes: a writing source having writing data; a word list having one or more sets of word data representing a predetermined image; and writing analyzing means which decomposes a writing in the writing source into a predetermined analysis unit which includes at least one sentence, extracts words existing in the word list from the analysis unit and creates an analytic table which shows each extracted word in accordance with the analysis unit. An image included in the writing can be analyzed based on various factors presented in the word list.

4 Claims, 14 Drawing Sheets

FIG.2

WRITING SOURCE

A R A B Y

NORTH RICHMOND STREET, being blind, was a quiet street except at the hour when the Christian Brothers' School set the boys free. An uninhabited house of two storeys stood at the blind end, detached from its neighbours in a square ground. The other houses of the street, conscious of decent lives within them, gazed at one another with brown imperturbable faces.

The former tenant of our house, a priest, had died in the back drawing-room. Air, musty from having been long enclosed, hung in all the rooms, and the waste room behind the kitchen was littered with old useless papers. Among these I found a few paper-covered books, the pages of which were curled and damp: The Abbot, by Walter Scott, The Devout Communicant, and The Memoirs of Vidocq. I liked the last best because its leaves were yellow. The wild garden behind the house contained a central apple-tree and a few straggling bushes, under one of which I found the late tenant's rusty bicycle-pump. He had been a very charitable priest; in his will he had left all his money to institutions and the furniture of his house to his sister.

When the short days of winter came, dusk fell before we had well eaten our dinners. When we met in the street the houses had grown sombre. The space of sky above us was the colour of ever-changing violet and towards it the lamps of the street lifted their feeble lanterns. The cold air stung us and we played till our bodies glowed. Our shouts echoed in the silent street. The career of our play brought us through the dark muddy lanes behind the houses, where we ran the gauntlet of the rough tribes from the cottages, to the back doors of the dark dripping gardens where odours arose from the ashpits, to the dark odorous stables where a coachman smoothed and combed the horse or shook music from the buckled harness. When we returned to the street, light from the kitchen windows had filled the areas. If my uncle was seen turning the corner, we hid in the shadow until we had seen him safely housed. Or if Mangan's sister came out on the doorstep to call her brother in to his tea, we watched her from our shadow peer up and down the street. We waited to see whether she would remain or go in and, if she remained, we left our shadow and walked up to Mangan's steps resignedly. She was waiting for us, her figure defined by the light from the half-opened door. Her brother always teased her before he obeyed, and I stood by the railings looking at her. Her dress swung as she moved her body, and the soft rope of her hair tossed from side to side.

Every morning I lay on the floor in the front parlour watching her door.

FIG.3

| NUMBERED TEXT |
|---|
| 0 : ARABY |
| 1 : NORTH RICHMOND STREET, being blind, was a quiet street except at the hour when the Christian Brothers' School set the boys free. |
| 2 : An uninhabited house of two storeys stood at the blind end, detached from its neighbours in a square ground. |
| 3 : The other houses of the street, conscious of decent lives within them, gazed at one another with brown imperturbable faces. |
| 4 : The former tenant of our house, a priest, had died in the back drawing-room. |
| 5 : Air, musty from having been long enclosed, hung in all the rooms, and the waste room behind the kitchen was littered with old useless papers. |
| 6 : Among these I found a few paper-covered books, the pages of which were curled and damp: The Abbot, by Walter Scott, The Devout Communicant, and The Memoirs of Vidocq. |
| 7 : I liked the last best because its leaves were yellow. |
| 8 : The wild garden behind the house contained a central apple-tree and a few straggling bushes, under one of which I found the late tenant's rusty bicycle-pump. |
| 9 : He had been a very charitable priest; in his will he had left all his money to institutions and the furniture of his house to his sister. |
| 10 : When the short days of winter came, dusk fell before we had well eaten our dinners. |
| 11 : When we met in the street the houses had grown sombre. |
| 12 : The space of sky above us was the colour of ever-changing violet and towards it the lamps of the street lifted their feeble lanterns. |
| 13 : The cold air stung us and we played till our bodies glowed. |

FIG.4

WORD LIST ("BRIGHT" LIST)

day
days
flare
flared
flares
flaring
glare
glared
glares
glaring
gleam
gleamed
gleaming
gleams
glow
glowed
glowing
glows
lamp
lamplight
lamplights
lamps
lantern
lanterns
light
lighting
lights
lit
morning
mornings
twinkle
twinkled
twinkles
twinkling

FIG.5

ANALYTIC TABLE

```
0  : ..
1  : ..
2  : ..
3  : ..
4  : ..
5  : ..
6  : ..
7  : ..
8  : ..
9  : ..
10 : days
11 : ..
12 : lamps, lanterns
13 : glowed
14 : ..
15 : ..
16 : light
17 : ..
18 : ..
19 : ..
20 : light
21 : ..
22 : ..
23 : morning
```

FIG.6

WORD HIGHLIGHT TEXT

A R A B Y

NORTH RICHMOND STREET, being blind, was a quiet street except at the hour when the Christian Brothers' School set the boys free. An uninhabited house of two storeys stood at the blind end, detached from its neighbours in a square ground. The other houses of the street, conscious of decent lives within them, gazed at one another with brown imperturbable faces.

The former tenant of our house, a priest, had died in the back drawing-room. Air, musty from having been long enclosed, hung in all the rooms, and the waste room behind the kitchen was littered with old useless papers. Among these I found a few paper-covered books, the pages of which were curled and damp: The Abbot, by Walter Scott, The Devout Communicant, and The Memoirs of Vidocq. I liked the last best because its leaves were yellow. The wild garden behind the house contained a central apple-tree and a few straggling bushes, under one of which I found the late tenant's rusty bicycle-pump. He had been a very charitable priest; in his will he had left all his money to institutions and the furniture of his house to his sister.

When the short days of winter came, dusk fell before we had well eaten our dinners. When we met in the street the houses had grown sombre. The space of sky above us was the colour of ever-changing violet and towards it the lamps of the street lifted their feeble lanterns. The cold air stung us and we played till our bodies glowed. Our shouts echoed in the silent street. The career of our play brought us through the dark muddy lanes behind the houses, where we ran the gauntlet of the rough tribes from the cottages, to the back doors of the dark dripping gardens where odours arose from the ashpits, to the dark odorous stables where a coachman smoothed and combed the horse or shook music from the buckled harness. When we returned to the street, light from the kitchen windows had filled the areas. If my uncle was seen turning the corner, we hid in the shadow until we had seen him safely housed. Or if Mangan's sister came out on the doorstep to call her brother in to his tea, we watched her from our shadow peer up and down the street. We waited to see whether she would remain or go in and, if she remained, we left our shadow and walked up to Mangan's steps resignedly. She was waiting for us, her figure defined by the light from the half-opened door. Her brother always teased her before he obeyed, and I stood by the railings looking at her. Her dress swung as she moved her body, and the soft rope of her hair tossed from side to side.

Every morning I lay on the floor in the front parlour watching her door.

FIG.9

WORD LIST (WITH ALLOCATED POINT)

| | |
|---|---|
| dawn | 0.6 |
| dim light | 0.6 |
| glare | 1 |
| lamp | 1 |
| light | 1 |
| shine | 1 |
| twilight | 0.6 |

FIG.10

ANALYTIC TABLE

| | | |
|---|---|---|
| 0 | ... | ... |
| 1 | ... | ... |
| 2 | ... | ... |
| 3 | :0.6 | :twilight(0.6) |
| 4 | ... | ... |
| 5 | ... | ... |
| 6 | ... | ... |
| 7 | :1 | :glare(1) |
| 8 | :0.6 | :dim light(0.6) |
| 9 | ... | ... |
| 10 | :0.6 | :dim light(0.6) |
| 11 | :2 | :light(1),shine(1) |
| 12 | :1.6 | :lamp(1),twilight(0.6) |
| 13 | :1 | :lamp(1) |
| 14 | :0.6 | :dawn(0.6) |
| 15 | :1 | :dawn(0.6),light(0.4) |
| 16 | :0.6 | :twilight(0.6) |
| 17 | ... | ... |
| 18 | :0.4 | :light(0.4) |
| 19 | ... | ... |
| 20 | :0.6 | :dim light(0.6) |
| 21 | ... | ... |
| 22 | ... | ... |
| 23 | ... | ... |

WRITING ANALYTIC APPARATUS AND WRITING ANALYTIC PROGRAM

BACKGROUND OF THE INVENTION (i) Field of the Invention

The present invention relates to a writing analytic apparatus which analyzes an image contained in a writing, and a writing analytic program.

(ii) Description of the Related Art

Writing analytic techniques have conventionally existed as those concerning translation or voice conversion of texts.

For example, in automatic language translation, there has been proposed, e.g., a system which performs writing analysis of writings in an original language, gives morphologic, syntactic and semantic characteristics corresponding to them, transfers analyzed writings into an intermediate language and then integrates them, represents it in an artificial international language having all of morphologic, syntactic and semantic characteristics of a language to be translated, transfers it into an intermediate language having all of structural characteristics of a target language, and then converts it into writings represented by concrete words in the target language (see, e.g., Japanese Patent Application Laid-open No. 6-325080). In writing analysis of this system, analysis of writings taking notice of writing structures is performed in order to enable representation of writings in a different language.

Further, in voice conversion of texts, there has been also proposed, e.g., an apparatus which can divide an inputted writing into words and correctly add reading and accents to them (see, e.g., Japanese Patent Application Laid-open No. 7-36905).

SUMMARY OF THE INVENTION

According to such conventional writing analysis, analysis of a writing structure or decomposition in a word level are possible.

However, a writing analytic technique which can analyze a content of a writing is not observed in conventional techniques.

That is, there has been no technique which can probe into various kinds of images contained in a given writing and analyze, e.g., what kind of tendency this writing has in order to grasp a type of this writing.

Furthermore, there has been no technique which can analyze a writing in a time series and analyze how images of this writing vary in a flow of this writing.

Moreover, there has been no technique which can trace changes in various kinds of elements such as characters or pleasure elements in a writing.

Additionally, when reading a writing, a reader gets various impressions depending on words in this writing. However, some words have a plurality of meanings; a reader can recognize meanings other than those of a word which appear in a context of a writing. Therefore, although it can be considered that such meanings other than those of a word which appear in a context have an impact on a consciousness different from a consciousness of a reader who follows the context, there is no writing analytic technique which can analyze an impact or the like which is given to a reader by such meanings other than those of the word in the context.

In view of the above-described problems, it is an object of the present invention to provide a writing analytic apparatus and a writing analytic program which can decompose a writing in a writing source into a predetermined analysis unit, extract words existing in a word list from this analysis unit, and create an analytic table representing each word extracted in accordance with the analysis unit by using the writing source having writing data and the word list having word data representing predetermined images, thereby analyzing images contained in the writing.

To achieve this aim, the writing analytic apparatus according to the present invention is configured to comprise:

a writing source having writing data;

a word list having one or more sets of word data which represent a predetermined image; and writing analyzing means which decomposes a writing in the writing source into a predetermined analysis unit, extracts words existing in the word list from this analysis unit, and creates an analytic table which shows the respective extracted words in accordance with the analysis unit.

By configuring the writing analytic apparatus in this manner, a writing can be decomposed in a predetermined analysis unit, whether words representing predetermined images are contained can be confirmed in accordance with the analysis unit, and a result can be extracted into an analytic table.

Therefore, it is possible to grasp an image which is given to a reader by this writing in a time series.

That is, by making reference to the analytic table created by the present invention, it is possible to clearly grasp tendencies of words used in a writing and comprehend an image which is given by this writing to a reader. Further, whether such words appear or the number of such words can be grasped in accordance with a predetermined analysis unit. Therefore, a flow of an image in the writing can be comprehended in a time series.

As this image analysis, with respect to an image which can be represented by many words, it is possible to verify whether this image is included in a writing. For example, various kinds of word data representing "brightness" (e.g., "light", "lamp", "glare" and the like) are contained in a word list, analysis according to the present invention is performed, and reference is made to an analytic table. As a result, it is possible to grasp which positions that word appears and how frequently it appears in that writing. Therefore, it is possible to readily grasp what kind of image is included in the writing and in which kind of flow it is represented in the same.

Furthermore, according to image analysis of the present invention, not only analysis of images a single word has can be performed, but a rhythm with which this word appears in a writing or a repetition of the same unison can be also grasped.

It is to be noted that various kinds of analysis which can be conducted by the writing analytic apparatus according to the present invention, e.g., analysis of an image that a writing has, analysis of characters, analysis of pleasure elements, analysis of a relationship between a plurality of writings or the like may collectively mean image analysis in some cases in this specification for convenience's sake. Moreover, the number of words to be extracted may be one (single word) or more (word group). There is a case that extracted words are single words or a word group extracted based on one word in a word list and a case that they are a word group extracted based on two or more words in the word list, but the word in the both cases will be simply referred to as a "word".

In this specification, as well as Japanese Patent Application No. 2003-177729 on which the priority of the present application is based, the word "writing" does not only mean written passages, but also it is used in the broad sense including the other expressions such as speaking.

In the writing analytic apparatus according to the present invention, the writing analyzing means comprises:

text creating means which decomposes the writing in the writing source in a predetermined analysis unit, gives a number in accordance with this analysis unit, and creates a numbered text; and analytic table creating means which extracts words existing in the word list from each analysis unit in the numbered text, and creates an analytic table which shows the respective extracted words in accordance with each number.

By configuring the writing analytic apparatus in this manner, when creating an analytic table according to the present invention, a writing can be decomposed in a predetermined analysis unit, numbers can be given to respective elements, a text with the numbers can be created, and an analytic table having word data extracted in accordance with each number can be created by using the text with the numbers.

Therefore, the analytic table can be created in a comprehensible form which is constituted by using only the numbers and the extracted word data, and the analytic table with which a flow of an image in the writing can be readily grasped can be created.

In the writing analytic apparatus according to the present invention, the analytic table creating means is configured to create a word recognition text which shows the respective extracted words in the writing of the writing source so as to be discriminated from other words based on:

the numbered text and the analytic table; or the numbered text and the word list; or the writing source and the analytic table; or the writing source and the word list.

By adopting such a structure for the writing analytic apparatus, which word is extracted as one representing a predetermined image in a writing can be recognized.

As this recognition method, for example, recognition can be performed by highlighting a word as an extraction target in a writing source.

By creating a word recognition text using this method and making reference to this text, whether analysis has been appropriately performed can be checked, and words as an extraction target in a writing can be clearly grasped.

Additionally, when creating this word recognition text, this text can be created based on the text with the numbers and the analytic table, but the present invention is not restricted thereto, and the word recognition text can be likewise created based on any of a combination of the text with the number and the word list, a combination of a writing source and the analytic table and a combination of the writing source and the word list.

The writing analytic apparatus according to the present invention is configured to comprise word appearance frequency graph creating means for creating a word appearance frequency graph which shows the number of the extracted words in accordance with each number based on the numbered text and the word list or the analytic table.

By configuring the writing analytic apparatus in this manner, a graph showing the number of words as extraction targets in accordance with the numbers can be created based on the analytic table or the like.

Therefore, how and what kind of images appear in a flow of a writing can be clearly grasped in a time series.

In the writing analytic apparatus according to the present invention, the word list has allocated point information of words, and the analytic table creating means calculates a total point of allocated points of each extracted word in accordance with each number based on the numbered text and the word list and creates an analytic table which shows the total point and each extracted word in accordance with each number or respective analytic tables with respect to words having the same allocated point information; or the word list has only words to which the same allocated point should be given, and the analytic table creating means creates an analytic table which shows each extracted word in accordance with each number based on the numbered text and the word list, and calculates a total point of allocated points of each extracted word in accordance with each number based on the analytic table and inputted allocated point information of words and creates an analytic table which shows the total point and each extracted word in accordance with each number.

By configuring the writing analytic apparatus in this manner, not only whether a word representing a predetermined image has appeared in a writing can be grasped, but also the analytic table can be created in accordance with a content of the appeared word while taking a degree that this image is given into consideration.

For example, when analyzing images of "brightness", the allocated point of words which obviously represent "brightness", e.g., "light", "lamp" and the like is determined as 1, the allocated point of words representing "half-light", e.g., "twilight", "dawn" and the like is determined as 0.6, and the analytic table having such point data can be created.

Further, when "light" is included in the word list, the allocated point is 1 if "light" is used as a word representing the brightness such as "light beam" in a context of a writing. However, if it is used as a word which means "light-weight" or "alight", it is assumed that the image of "brightness" which is given to a reader by appearance of this word is approximately 40%, the point, e.g., 0.4 can be given and its impact can be finely adjusted.

Furthermore, as to the analytic table according to the present invention, it is possible to create one analytic table which shows a total value of allocated point in accordance with each number, or a plurality of analytic tables for each point, e.g., an analytic table of words each having one point or an analytic table for words each having 0.6 point.

Moreover, the word list in the present invention may be created in accordance with each word having the same allocated point.

In the writing analytic apparatus according to the present invention, the word appearance frequency graph creating means creates a word appearance frequency graph which shows the total point in accordance with each number based on the analytic table.

By configuring the writing analytic apparatus in this manner, a word appearance frequency graph can be created based on an analytic table having allocated point information taking the impact given to an image to be analyzed by each extracted word into consideration.

In this case, a total point of allocated points of each word extracted in accordance with each number can be used as a number of times of appearance of a word in a writing corresponding to that number.

That is, the allocated point is 1 with respect to a word which obviously represents an image as an analysis target, the allocated point is less than 1 with respect to a word which does not clearly represent that image but seemingly represents it to some extent or a word which may possibly exert an impact on a reader about that image, and the allocated point 1 is considered as an appearance frequency 1. As a result, the impact of a word other than those having consciously clearly comprehensible images which is exerted on a reader can be also grasped in the word appearance frequency graph.

Incidentally, even if a plurality of analytic tables exist in accordance with each allocated point, it is possible to create a word appearance frequency graph of all extracted words by totaling the allocated points for each number in each analytic table.

The writing analytic apparatus according to the present invention is configured to comprise comparison judging means which judges whether images of the plurality of writings resemble each other by creating a word appearance frequency graph which shows the word appearance frequency graphs for respective writings in a superposing manner based on the respective analytic tables created based on the plurality of writing sources, or by comparing total points of allocated points of the respective extracted words with each other in accordance with respective writings.

By configuring the writing analytic apparatus in this manner, not only image analysis can be performed with respect to one given writing, but a relationship between a plurality of writings can be analyzed.

That is, according to the present invention, since a word appearance frequency graph which shows word appearance frequency graphs for respective writings in a superposed manner can be created, an influence relationship between a plurality of writings can be checked by making reference to this graph.

Additionally, since a total point of allocated points of words extracted in respective writings can be calculated and compared based on analytic tables obtained for the respective writings, it is possible to judge how much these writings have a common image, for example.

The writing analytic apparatus according to the present invention is configured to comprise word list creating means for creating the word list based on predetermined dictionary data.

By configuring the writing analytic apparatus in this manner, a word list in this writing analytic apparatus can be created not only manually by selecting appropriate words in advance, but also automatically based on a predetermined dictionary.

As a dictionary as source data used to perform automatic creation of such a word list, one including predetermined classification information for each word in advance must be used.

Further, word data representing a predetermined image is extracted from dictionary data based on this classification information.

In this manner, for example, words classified into "plant" can be extracted by using the dictionary data, and a word list can be automatically created.

Furthermore, by previously registering as dictionary data the classification information of modification forms of each word which is the same as the classification information of a basic form, words such as those in the plural form, the third person singular present tense form, the past tense form, the past participle form or the like can be automatically appropriately extracted, and a word list can be created.

In the writing analytic apparatus according to the present invention, the word list has at least any of one or more sets of word data representing a predetermined image, one or more sets of word data representing characters in the writing, and one or more sets of word data representing pleasure elements.

By providing such a structure to the writing analytic apparatus, words representing predetermined images such as "brightness", "darkness" or "domination", words representing features of a character or words representing pleasure elements can be included in a word list as analysis targets in the present invention, and they can be analyzed.

According to the writing analytic apparatus of the present invention, the predetermined analysis unit is one sentence.

By providing such a structure to the writing analytic apparatus, the analysis unit can be determined as one sentence.

Therefore, states or flows of images in writings can be grasped in accordance with each sentence in a time series.

BRIEF DESCRIPTION OF THE DRAWINGS

FIG. 2 is a view showing a writing source in writing analysis according to the first embodiment of the present invention;

FIG. 3 is a view showing a text with numbers in writing analysis according to the first embodiment of the present invention;

FIG. 4 is a view showing a word list ("bright" list) in writing analysis according to the first embodiment of the present invention;

FIG. 5 is a view showing an analytic table in writing analysis according to the first embodiment of the present invention;

FIG. 6 is a view showing a word highlight text in writing analysis according to the first embodiment of the present invention;

FIG. 9 is a view showing a word list (with allocated points) in writing analysis according to a third embodiment of the present invention;

FIG. 10 is a view showing an analytic table in writing analysis according to the third embodiment of the present invention;

DETAILED DESCRIPTION OF THE PREFERRED EMBODIMENTS

Embodiments according to the present invention will now be described hereinafter with reference to the accompanying drawings.

First Embodiment

Figure 1:
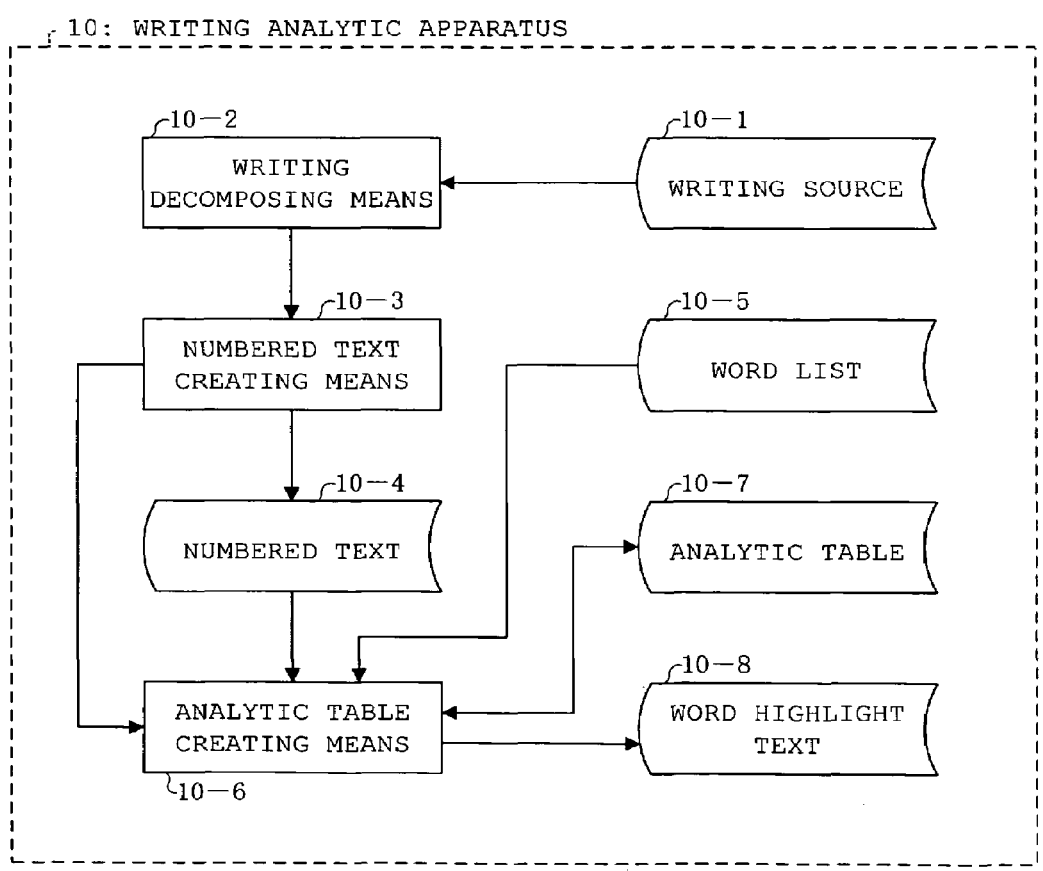
FIG. 1 is a block diagram showing a structure of a writing analytic apparatus according to a first embodiment of the present invention.

A structure of a first embodiment according to the present invention will be first described with reference to FIGS. 1 to 6. FIG. 1 is a block diagram showing a structure of a writing analytic apparatus according to this embodiment. FIGS. 2 to 6 are views showing a writing source, a text with numbers, a word list ("bright" list), an analytic table and a word highlight text.

[Writing Analytic Apparatus 10]

A writing analytic apparatus according to the present invention can be configured as an information processing apparatus such as a personal computer, a server, a work station or a PDA in which a writing analytic program according to the present invention is installed, or as a part of such an apparatus.

Further, in the writing analytic apparatus according to the present invention, by installing a writing analytic program according to the present invention, this program is developed in a memory in the writing analytic apparatus, and the writing analytic apparatus is realized by executing each processing in accordance with this program by a CPU of the writing analytic apparatus. The following respective means in the writing analytic apparatus are established by this CPU, the memory in which the writing analytic program is stored, and others.

As shown in FIG. 1, the writing analytic apparatus 10 has a writing source 10-1, writing decomposing means 10-2, numbered text creating means 10-3, a numbered text 10-4, a word list 10-5, analytic table creating means 10-6, an analytic table 10-7, and a word highlight text 10-8.

[Writing Source 10-1]

The writing source 10-1 is a storage portion which holds a writing as a target analyzed by the writing analytic apparatus 10 according to this embodiment, and this can be held as a file or a data base in the writing analytic apparatus 10. In this embodiment, it is assumed that the writing source 10-1 is created as a text file.

FIG. 2 shows an example of this writing source 10-1. In the drawing, although a part of the writing is shown, the writing source 10-1 can be configured to include all of a given writing. Furthermore, although the writing in this drawing is written in English, a language of the writing is not restricted to English, and a writing written in every language such as Japanese can be held as an analysis target in the present invention. Of course, a word list corresponding to a particular language is created in this case.

The writing included in this writing source 10-1 is not restricted to any particular type as long as it is a writing such as a writing in the literature such as a novel or an essay, an article in newspapers or magazines, or a text obtained by converting voice information, and various kinds of writings can be used.

[Writing Decomposing Means 10-2]

The writing decomposing means 10-2 reads the writing source 10-1 and decomposes it in a predetermined analysis unit. In this embodiment, the writing is decomposed into each sentence from the beginning. Moreover, each part of the decomposed writing is supplied to the numbered text creating means 10-3.

[Numbered Text Creating Means 10-3, Numbered Text 10-4]

The numbered text creating means 10-3 gives numbers to respective parts in the decomposed writing, and creates a numbered text 10-4. FIG. 3 shows an example of this numbered text 10-4. This drawing shows an example in which serial numbers are given to respective sentences in the writing.

[Word List 10-5]

The word list 10-5 is a storage portion having various kinds of words representing an image as an analysis target according to the present invention, and it is one of very important elements in analysis according to the present invention. That is, image analysis of a writing according to the present invention is performed based on this word list, many different images can be analyzed by using many lists as the word lists.

Although data or the like to be registered in this word list is not restricted to a particular type, images included in a writing can be effectively analyzed by using the following types of words.

The following shows examples of the classification of image analysis targets into general image analysis, character analysis and pleasure element analysis and types of words effective for each analysis.

<Image Analysis>

Brightness, darkness, Catholic, dominance, subordinate, Arab society, plant, bird, and others.

<Character Analysis>

1. Character type in morality play

Human, devil, angel, virtue, vice, knowledge, repentance, relative, wealth, and others.

2. Custom comedy

King, aristocrat, knight, clown, monk, soldier, scholar, mayor, merchant, craftsman, farmer, actor, peddler, beggar, thieve, and others.

<Pleasure Element Analysis>

1. Pleasure brought by emotional involvement to a main character

A. Power magnifying sense

Supernaturalism, God's power, magic, ESP power, dream, authority, financial power, prowess, attractive appearance, exceptional talent, and others.

B. Novelty

Adventure, legwork, exoticism and others.

C. Emotional intensity of main character

Anger, sadness, desperation, expectation, joy, joviality, anxiety and others.

2. Reader's own pleasure

A. Reader's own emotional intensity

Pleasantry, thrill, suspense, fear, nostalgia, childness, unpredictability, and others.

Moreover, if a type of word is "king", for example, the following words can be included as word data in the word list.

King, kingdom, territory, realm, queen, queen consort, princess, prince, dauphin, crown prince, prince royal, duke, throne, sovereignty, privy seal, scepter, diadem, crown, majesty, we, accession, abdication, I, II, III, IV, V, VI, VII, VIII (first to eighth), and others.

FIG. 4 shows a list which holds words used to analyze the image of "brightness" as an example of such a word list 10-5.

[Analytic Table Creating Means 10-6, Analytic table 10-7, Word Highlight Text 10-8]

The analytic table creating means 10-6 creates the analytic table 10-7 by using the numbered text 10-4 and the word list 10-5.

At this time, the analytic table creating means 10-6 searches whether there is word data which exists in the word list 10-5 in accordance with each number in the writing in the numbered text 10-4. Further, if there is such data, it writes that word into the analytic table 10-7 in association with that number. FIG. 5 shows an example of the thus created analytic table 10-7.

Furthermore, the analytic table creating means 10-6 creates the analytic table 10-7 as well as the word highlight text 10-8.

This word highlight text 10-8 can be created based on the numbered text 10-4 and the analytic table 10-7.

In this case, the analytic table creating means 10-6 acquires a number with which a word is registered and a word associated with that numbers from the analytic table 10-7, searches a sentence with the number in the numbered text 10-4 by using the word as a key, and sets an attribute at a hit word part to be highlighted in display. After performing this operation with respect to all the numbers, it eliminates the numbered parts from the numbered text 10-4, creates a writing in which the words extracted as analysis targets are highlighted, and outputs it as the word highlight text 10-8.

Furthermore, creation of the word highlight text 10-8 by the analytic table creating means 10-6 is not restricted to such processing, and it can be created by any other various methods. For example, the analytic table creating means 10-6 can likewise create the word highlight text 10-8 based on the numbered text 10-4 and the word list 10-5, or based on the writing source 10-1 and the analytic table 10-7 or based on the writing source 10-1 and the word list 10-5.

FIG. 6 shows an example of the word highlight text 10-8 created in this manner.

It is to be noted that the words extracted as analysis targets can be readily found in the writing by highlighting them in the display in this embodiment, but the present invention is not restricted thereto. It is good enough if extracted words can be recognized from other words in the writing.

Therefore, it is also preferable to enable recognition of a word by changing its color in place of highlighting it and cause the analytic table creating means 10-6 to create a word recognition text.

A processing procedure in the writing analytic apparatus according to this embodiment will now be described with reference to FIG. 1.

[Processing Procedure in Writing Analytic Apparatus]

First, a writing which should be an analytic target (see FIG. 2) and a word list (see FIG. 4) having words representing images to be analyzed are stored in the writing analytic apparatus in advance.

Then, by executing the writing analytic program according to the present invention, the writing decomposing means 10-2 decomposes the writing in the writing source 10-1 in a sentence unit, and delivers a result to the numbered text creating means 10-3.

Subsequently, the numbered text creating means 10-3 gives serial numbers to the respective received sentences in sequence, creates the numbered text 10-4 (see FIG. 3), and instructs the analytic table creating means 10-6 to execute its function.

In response to this, the analytic table creating means 10-6 creates the analytic table 10-7 (see FIG. 5) based on the numbered text 10-4 and the word list 10-5, creates the word highlight text 10-8 (see FIG. 6), and terminates the processing.

As described above, according to the writing analytic apparatus of this embodiment, the writing can be decomposed in a predetermined analysis unit, whether words representing predetermined images are included can be confirmed in this analysis unit, and the analytic table showing the corresponding words in the analysis unit can be created.

Therefore, images given to a reader by the writing can be grasped in a time series.

That is, by making reference to the analytic table created by the present invention, tendencies of words used in a writing can be clearly grasped, images given to a reader by the writing can be comprehended, and presence/absence or the number of such words can be grasped in accordance with a predetermined analysis unit, thereby enabling to obtain a flow of images in the writing in a time series.

Moreover, according to the writing analytic apparatus of this embodiment, it is possible to create the word highlight text in which words as analytic targets can be recognized in a writing. Whether analysis was appropriately performed can be checked based on this word highlight text, and words as extraction targets in the writing can be clearly grasped.

Additionally, according to the writing analytic apparatus of this embodiment, it is possible to grasp an image brought into a writing by each word as well as an image given in the writing by a plurality of words.

For example, the repetition of the same sound, a rhythm of a writing or the like can be comprehended by making reference to the analytic table or the like and grasping appearance of unisonant words, and the reader's own pleasure described in conjunction with the word list can be acquired.

Second Embodiment

Figure 7:
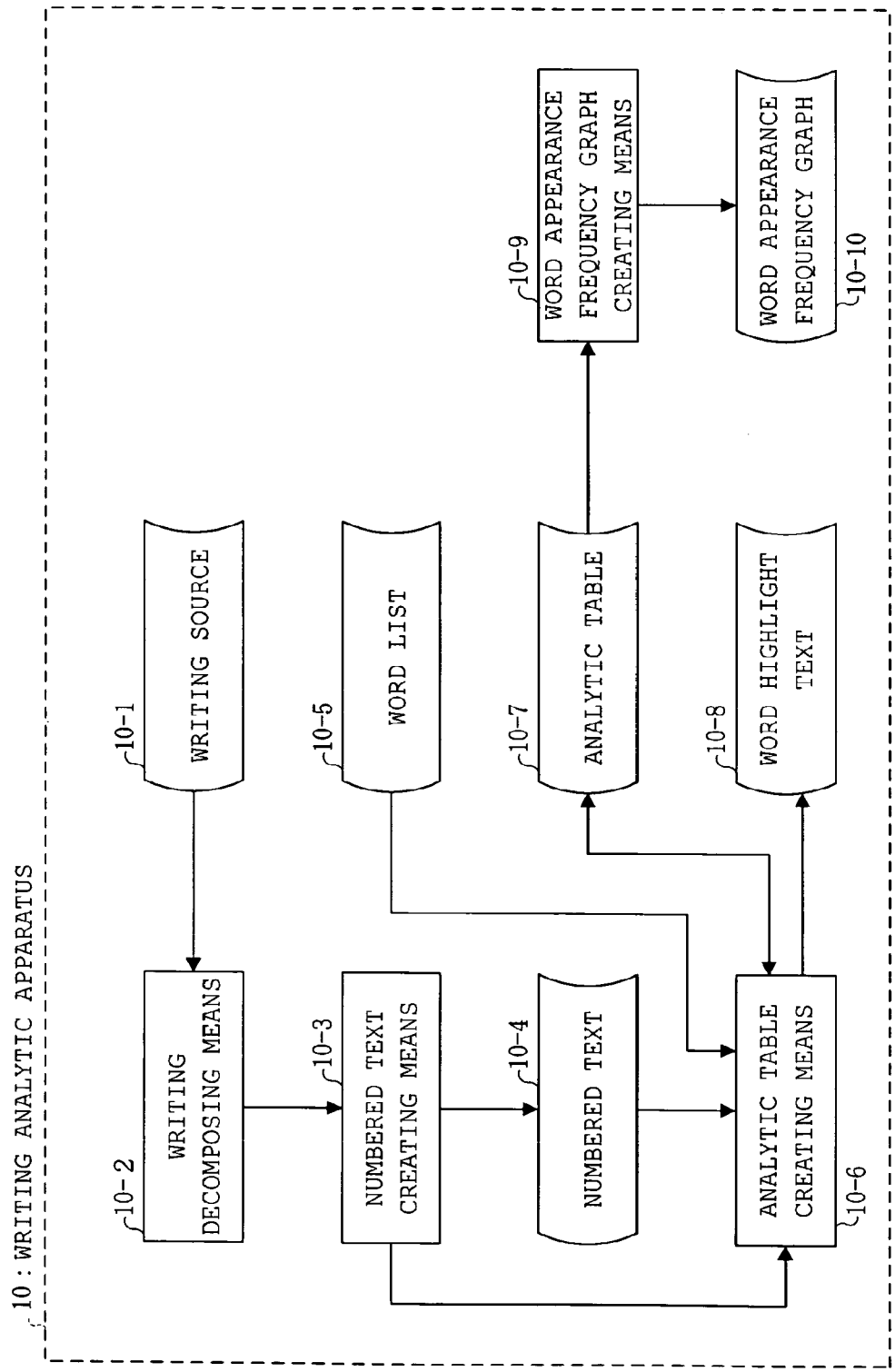
FIG. 7 is a block diagram showing a structure of a writing analytic apparatus according to a second embodiment of the present invention.
Figure 8:
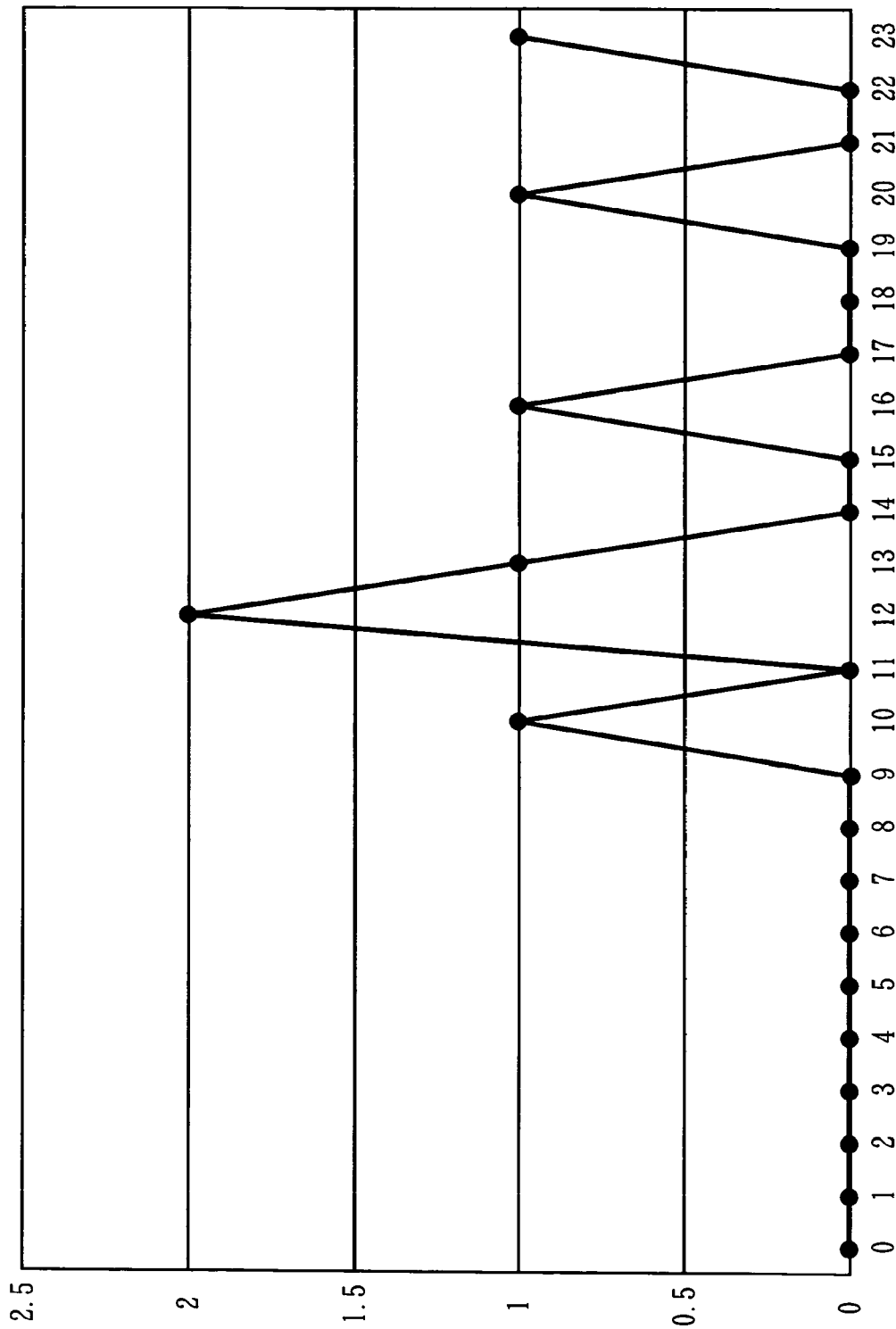
FIG. 8 is a view showing a word appearance frequency graph in writing analysis according to the second embodiment of the present invention.

A second embodiment according to the present invention will now be described with reference to FIGS. 7 and 8. FIG. 7 is a block diagram showing a structure of a writing analytic apparatus according to this embodiment. FIG. 8 is a view showing a word appearance frequency graph in writing analysis according to this embodiment.

This embodiment is different from the first embodiment in that there is created a graph with which a frequency at which a word as a analysis target appears in a writing can be grasped in a time series. Any other points are the same as those in the first embodiment.

As shown in FIG. 7, the writing analytic apparatus according to this embodiment has word appearance frequency graph creating means 10-9 and a word appearance frequency graph 10-10 in addition to the structures in the first embodiment.

[Word Appearance Frequency Graph Creating Means 10-9, Word Appearance Frequency Graph 10-10]

The word appearance frequency graph creating means 10-9 creates the word appearance frequency graph 10-10 which represents an appearance frequency of a word as an analysis target based on information in the analytic table 10-7. FIG. 8 is a view showing an example of the word appearance frequency graph 10-10 created by this word appearance frequency graph creating means 10-9.

This drawing is created based on the analytic table 10-7 depicted in FIG. 5, and shows that one word was extracted with respect to the number 10 and two words were extracted with respect to the number 12.

By making reference to this word appearance frequency graph 10-10, it is possible to clearly grasp in what kind of flow a word representing an image to be analyzed appears or disappears in a writing as an analysis target in a time series.

Therefore, it is possible to appropriately comprehend in what kind of flow and what intensity an image as an analysis target appears in the writing.

It is to be noted that the word appearance frequency graph creating means 10-9 is configured to create the word appearance frequency graph 10-10 based on the analysis table 10-7 in this embodiment, but the present invention is not restricted thereto, and the word appearance frequency graph creating means 10-9 can be configured to create the word appearance frequency graph 10-10 based on the numbered text 10-4 and the word list 10-5. In this case, the word appearance frequency graph creating means 10-9 can search whether words held in the word list 10-5 exist in accordance with each sentence in the numbered text 10-4, and count the number of hit words in accordance with a number corresponding to each sentence, thereby creating the word appearance frequency graph 10-10.

Further, this embodiment has a structure in which the word appearance frequency graph 10-10 is created by executing the word appearance frequency graph creating function in the writing analytic program separately from creation of the analytic table 10-7 and the word highlight text 10-8, but it is also preferable to have a structure in which the analytic table creating means 10-6 creates the analytic table 10-7 and the word highlight text 10-8 and then the word appearance frequency graph creating means 10-9 is caused to execute processing to create the word appearance frequency graph 10-10.

By using the word appearance frequency graph according to this embodiment, the repetition of the same sound, a rhythm of a writing or the like can be further clearly grasped as compared with the example in the first embodiment.

An example of image analysis to grasp the repetition of the same sound in a writing will now be described in detail.

<Repetition of Same Sound>
1. The following list is prepared as a word list.

A word list for alliterate analysis: a word list constituted of words which starts from the same sound is created.

For example, there are liar, libel, Lias, lie, life, light, like, line lion, lycanthrope, lye, lyre and others.

A word list for rhyme analysis: a word list constituted of words which ends with the same sound is created.

For example, there are ooyuki, dokayuki, sakiyuki, okuyuki, sakuyuki, koyuki, konayuki and others.
2. The above-described writing analytic processing is executed by using each word list, and the analytic table 10-7 and the word appearance frequency graph 10-10 are created. As a result, there is created the word appearance frequency graph 10-10 with which the alliteration or the end rhyme can be clearly grasped in a time series.

As described above, according to the writing analytic apparatus of this embodiment, the word appearance frequency graph which shows the number of words as extraction targets in accordance with the respective numbers can be created based on the analytic table and others.

Therefore, it is possible to clearly comprehend what kind of image appears and how it appears in a flow of a writing in a time series.

Furthermore, repetition of the same sound, a rhythm of a writing, or the like can be further clearly grasped by using the word appearance frequency graph according to this embodiment, and the reader's own pleasure described in conjunction with the word list can be further effectively comprehended.

Third Embodiment

A third embodiment according to the present invention will now be described with reference to FIGS. 9 to 12. These drawings are views showing a word list (with allocated points), an analytic table, a word appearance frequency graph and an allocated point input window in writing analysis according to this embodiment.

This embodiment is different from the second embodiment in that the analytic table 10-7 or the word appearance frequency graph 10-10 can be created taking an impact of each word given to an image into consideration in image analysis. Any other points are the same as those in the second embodiment, and the same drawing as FIG. 7 can be used as the block diagram of the writing analytic apparatus according to this embodiment.

Before analyzing a writing by using the writing analytic apparatus according to the present invention, a word which is used for analysis must be first determined and a word list having this word must be created. However, it can be considered that an impact which is given to an image to be analyzed or the like differs depending on each word.

For example, when analyzing an image of "brightness" in a writing, there are obviously words representing "bright" and words representing "lambent light". Furthermore, some words have a plurality of meanings, and hence such words are not necessarily used with the meaning of "brightness". However, even if such words are not used with the meaning of "brightness", it can be considered that they may give an image of "brightness" to a reader.

Such a phenomenon is called a semantic network in semantics or cognitive psychology.

That is, each word bears several meanings at the same time other than a first meaning. Even if a reader consciously considers a primary meaning (which is a meaning different from an image as an analysis target in this case), there is a possibility that he/she subconsciously recognizes some secondary meanings (which are the same meaning as an image as an analysis target in this case). It can be considered that such secondary meanings may often disappear without being brought up in a reader's consciousness. However, when many other words which bear an image as an analysis target appear, it can be considered that these meanings are activated and brought up in a reader's consciousness.

In this embodiment, a degree of such an impact which differs depending on each word and is given to an image to be analyzed can be considered and analyzed by giving an allocated point to each word.

As a concrete processing method of image analysis in the writing analytic apparatus according to this embodiment, there are the following methods.

<1. Method to Give Word List Allocated Point for Word>

First, by using such a word list as shown in FIG. 9, image analysis can be performed taking an impact which is given to an image by each word into consideration.

The word list in FIG. 9 is a word list used to analyze an image of "brightness", and an allocated point 1 is given to a word which obviously represents "bright". Furthermore, an allocated point 0.6 is given to each word which represents "lambent light".

When the writing analytic program according to the present invention is executed by using such a word list, the analytic table creating means 10-6 in the writing analytic apparatus totalizes the allocated points for each extracted word in accordance with each number before creating the analytic table 10-7, and then creates the analytic table 10-7 such as shown in FIG. 10.

This drawing shows a total point of the allocated points with respect to each extracted word in accordance with each number as well as words having the allocated numbers. However, it may show only one of them.

Here, in this drawing, although there are words having the allocated point "0.4", they are words having the meaning representing "brightness", but they are used with a meaning other than that representing "brightness" in that writing. They are obtained by directly manually correcting the analytic table 10-7 by making reference to the word highlight text 10-8. In this case, it is assumed that "light" is used with the meanings of "light-weighted, alight", and an image of "brightness" which is thereby given to a reader is presumed to be approximately 0.4 point, and this allocated point is given. Of course, such allocated points can be appropriately adjusted.

Moreover, it is desirable to automatically give an allocated point with respect to a word having a plurality of meanings, e.g., an allocated point with respect to a word which is used with a meaning different from an image as an analysis target by making reference to words before and after this words based on the word highlight text 10-8 by using the analytic table creating means 10-6 and specifying their meanings or parts of speech.

Figure 11:
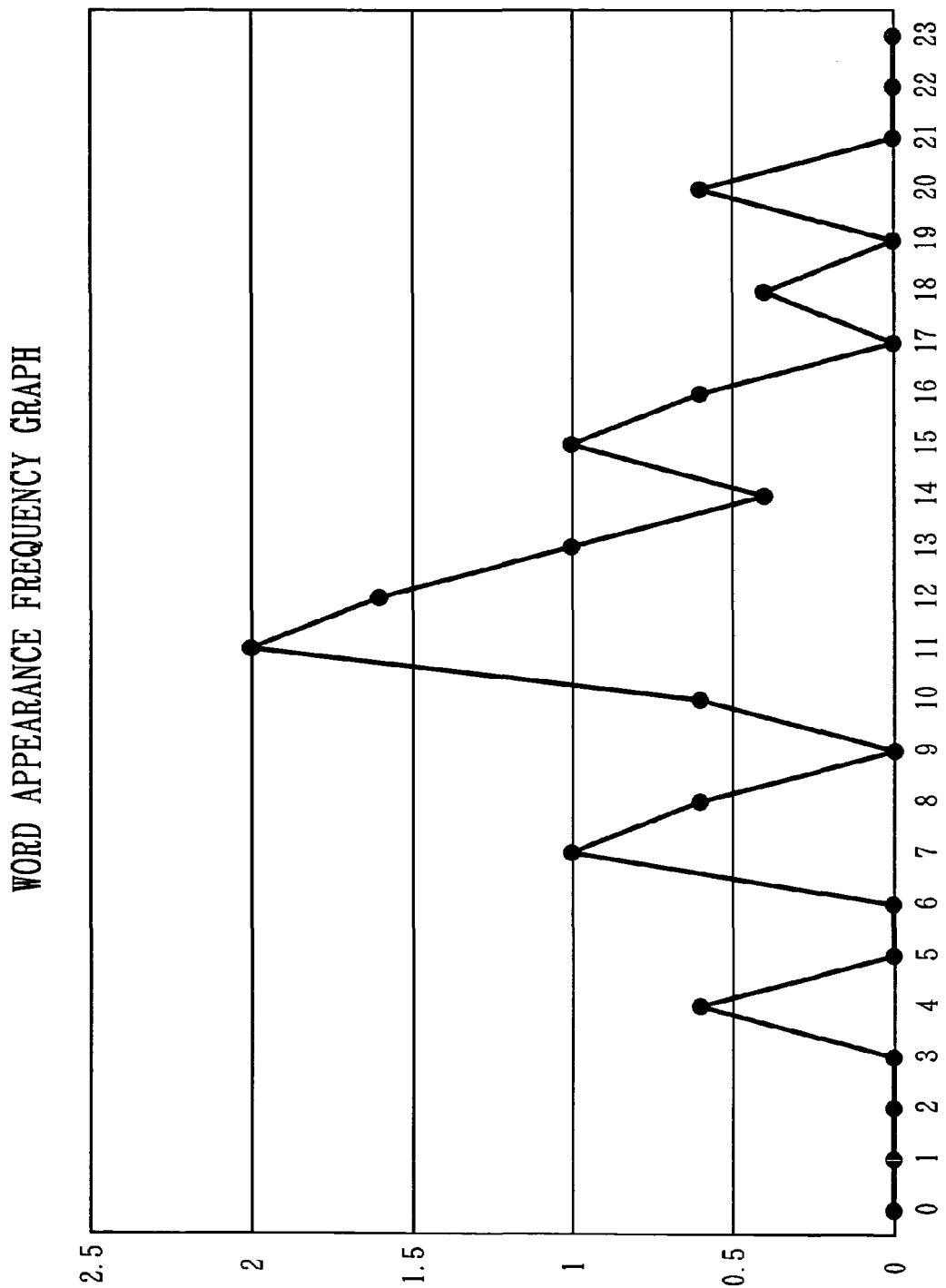
FIG. 11 is a view showing a word appearance frequency graph in writing analysis according to the third embodiment of the present invention.

Additionally, the writing analytic apparatus according to this embodiment can create such a word appearance frequency graph 10-10 as shown in FIG. 11 based on the analytic table 10-7 by using the word appearance frequency graph creating means 10-9. In this word appearance frequency graph 10-10, a case in which a total point for each number is 1 is determined as an appearance frequency 1.

Further, like the second embodiment, the word appearance frequency graph creating means 10-9 can be caused to create the word appearance frequency graph 10-10 based on the numbered text 10-4 and the word list 10-5.

In this case, the word appearance frequency graph creating means 10-9 totalizes allocated points of extracted words in accordance with each number based on allocated point information of the word list 10-5, and determines a total point 1 as an appearance frequency 1, thereby creating the word appearance frequency graph 10-10. This is the same in the following methods 2 and 3.

<2. Method to Create Word List having Allocated Point Information in accordance with Respective Words having Different Allocated Points>

A description will now be given as to a method to create a word list in accordance with respective words having different allocated points and perform image analysis by using this list while taking an impact given by each word to an image into consideration.

As a word list, the word list shown in FIG. 9 is divided, a list having an allocated point 1 and a list having an allocated point 0.6 are held in the writing analytic apparatus, and the analytic table creating means 10-6 is caused to create the analytic table 10-7 by using these word lists 10-5.

In this case, the allocation point does not have to be given to each word as shown in FIG. 9. For example, it can be given to a file name, and allocated point information of each word list 10-5 can be provided to the analytic table creating means 10-6.

The analytic table creating means 10-6 creates each analytic table 10-7 in accordance with each allocated point based on the numbered text 10-4 and each word list 10-5 mentioned above. That is, in this case, it is possible to create the analytic table 10-7 with respect to words having the allocated point 1 and the analytic table 10-7 having the allocated point 0.6.

Furthermore, the analytic table creating means 10-6 can be caused to create the analytic table 10-7 which has both words with the allocated point 1 and words with the allocated point 0.6 based on the numbered text 10-4 and each word list 10-5.

It is to be noted that the words with the allocated point 0.4 are the same as those in the method 1 described above.

The word appearance frequency graph creating means 10-9 creates the word appearance frequency graph 10-10 based on these analytic tables 10-7. Even if each analytic table 10-7 was created in accordance with each allocated point, the word appearance frequency graph creating means 10-9 can create such a word appearance frequency graph as shown in FIG. 11 based on information of all the analytic tables 10-7.

<3. Method to Create Word List in Accordance with Each Word Having Different Allocated Point and Enable Manual Input of Allocated Point from Allocated Point Input Window>

A description will now be given as to an example in which a word list is created in accordance with each word having a different allocated point, manual input of allocated points is enabled and image analysis is performed while taking each impact given to an image by each word into consideration.

In this case, the allocated point does not have to be held in the word list itself, such a word list as shown in FIG. 4 is created in accordance with each word having a different allocated point, and the writing analytic program according to this embodiment is executed.

In this case, like the second embodiment, such an analytic table 10-7 as shown in FIG. 5 is created.

Then, by providing allocated point information to the thus created analytic table 10-7, an analytic table 10-7 with allocated points is created.

Figure 12:
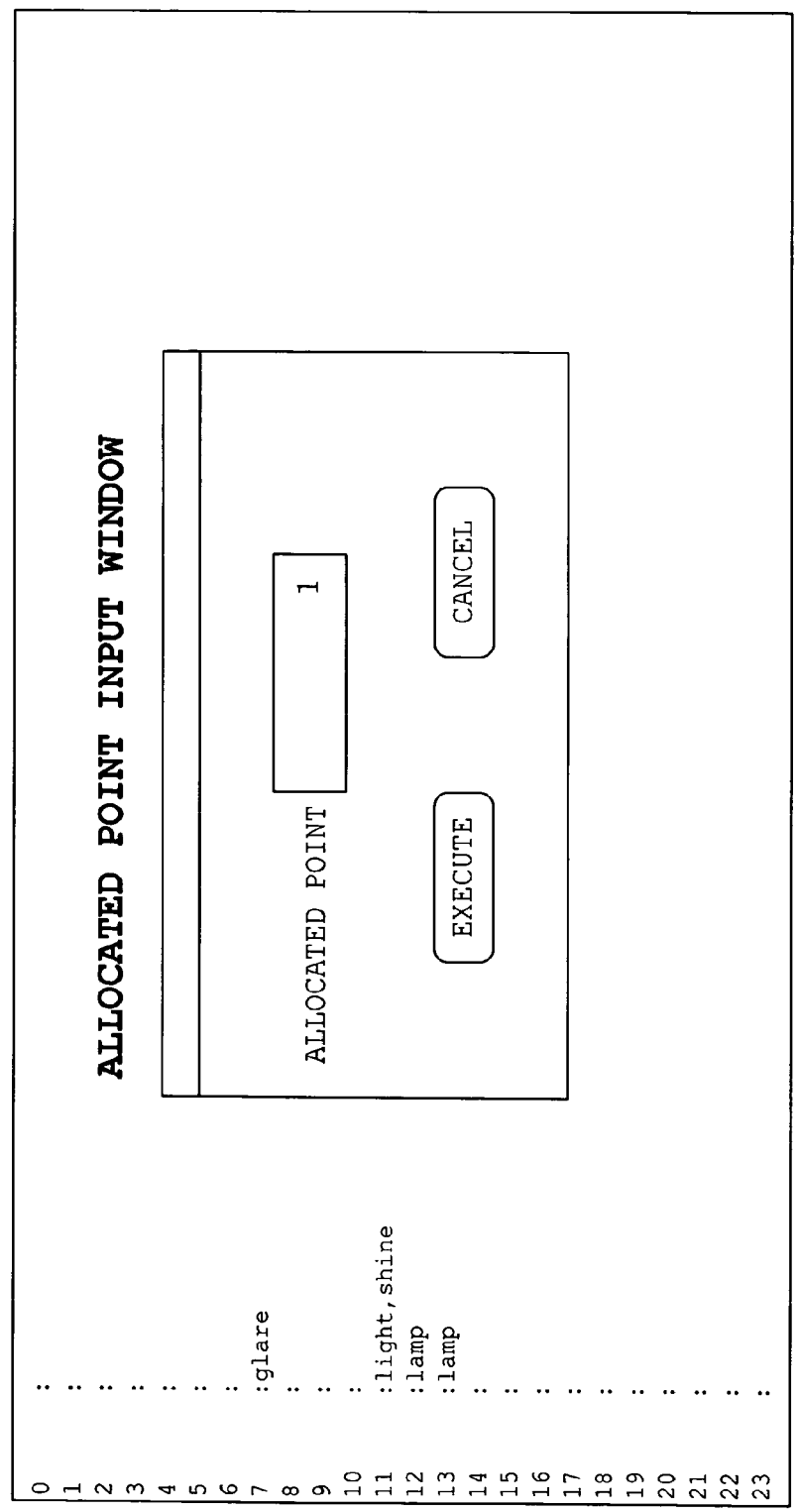
FIG. 12 is a view showing an allocated point input window in writing analysis according to the third embodiment of the present invention.

Here, as a method of providing the allocated point information to the analytic table 10-7, as shown in, e.g., FIG. 12, the first created analytic table 10-7 having no allocated point information is opened, a window which gives the allocated point information is displayed, allocated points are inputted, and thereafter an execution button is pressed. As a result, there can be created such an analytic table 10-7 as shown in FIG. 10 which shows only words with a specific allocated point (e.g., words with the allocated point 1). The writing analytic program can provide display of such an allocated point input window as a function of, e.g., the analytic table creating means 10-6.

Moreover, the word appearance frequency graph creating means 10-9 creates such a word appearance frequency graph 10-10 as shown in FIG. 11 by using the analytic table 10-7 with the allocated point 1 having information about words with the allocated point 0.4 added thereto and the analytic table 10-7 with the allocated point 0.6 like the method 1 mentioned above.

By causing the writing analytic apparatus according to this embodiment to create the analytic table by such a processing method, since the word list having the allocated point information does not have to be created in advance, it is possible to create the analytic table or the like taking an impact of each word given to an image into consideration without imposing an additional burden on creation of the word list.

Using the word appearance frequency graph according to this embodiment taking the allocated points into account enables further clear comprehension of a rhythm of a writing or the like as compared with the second embodiment.

An example of image analysis to comprehend a rhythm of a writing will now be described in detail.

<Rhythm of Writing>

1. As the word list, the following lists are prepared.

Word list A: a list composed of only nouns, adjectives, verbs, adverbs or the like (adjectival verbs are also included in case of Japanese) with strong accents except articles, prepositions, auxiliary verbs, conjunctions and pronouns (particles are also included in case of Japanese) with weak accents from a general dictionary.

Word list B: a list composed of only auxiliary verbs, conjunctions and pronouns with slightly strong accents.

Word list C: a list composed of only interjections (exclamations in case of Japanese. For example, aa, oo, nanto and others) with particularly strong accents.

2. The analytic table 10-7 is created based on each word list.

At this time, an allocated point 1 for one word is given to the analytic table A created based on the word list A, and this table is digitalized. Likewise, an allocated point 0.5 for one word are given to the analytic tables B created based on the word list B and an allocated point 1.5 for one word are given to the analytic tables C created based on the word list C, and these tables are digitalized.

3. A total point of accents in each sentence is calculated based on the analytic tables A, B and C, and the word appearance frequency graph 10-10 with which the accents can be comprehended in a time series is created.

As described above, according to the writing analytic apparatus of this embodiment, not only how a word representing a predetermined image appears can be grasped in a times series, but the analytic tables and the word appearance frequency graph can be created while taking an impact brought to the predetermined image by this appeared word into consideration.

Additionally, a rhythm of a writing or the like can be further clearly grasped by using such a word appearance frequency graph, and the reader's pleasure mentioned above in conjunction with the word list can be further effectively comprehended.

Fourth Embodiment

A fourth embodiment according to the present invention will now be described with reference to FIG. 13. This drawing is a block diagram showing a structure of a writing analytic apparatus according to this embodiment.

This embodiment is different from the third embodiment in that the writing analytic apparatus can analyze a relationship between a plurality of writings. Any other points are the same as those in the third embodiment.

That is, the writing analytic apparatus according to this embodiment can create a word appearance frequency graph 10-10 which shows respective word appearance frequency graphs created based on a plurality of writings in a superposing manner.

Further, by comparing points in an analytic table 10-7 created from respective writings with each other, it is possible to, e.g., judge the resemblance or impacts of these writings.

Specifically, the following relationship analysis can be performed, for example.

1. An impact relationship between a plurality of writings is examined.
   Example: Lewis Carroll's *Alice's Adventures in Wonderland* and Tolkien's *The Lord of the Rings*
2. A given writing is compared with a typical writing in a specific genre.
   Example: Jules Verne's *Deux Ans de Vacances* and Golding's *Lord of the Flies*
3. A plurality of writings written by the same author are compared with each other.
   Example: *Old Man and the Sea* and *The Snows of Kilimanjaro* by Hemingway
4. Writings written by a plurality of authors in the same era are compared with each other.
   Example: Dickens's "David Copperfield" and Charlotte Bronte's "Jane Eyre"

Figure 13:
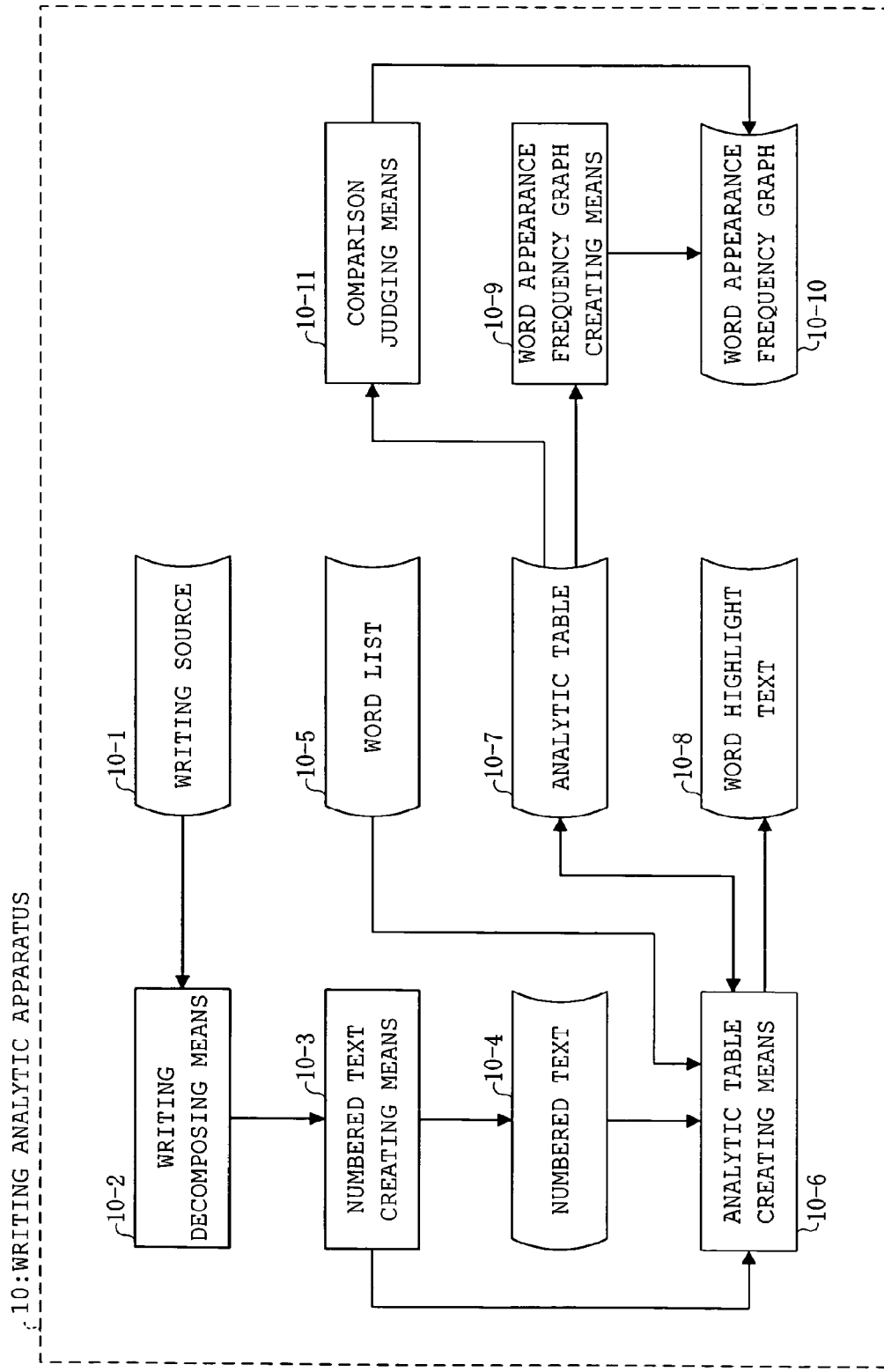
FIG. 13 is a block diagram showing a structure of a writing analytic apparatus according to a fourth embodiment of the present invention.

As shown in FIG. 13, the writing analytic apparatus according to this embodiment has comparison judging means 10-11 in addition to the structures in the third embodiment.

[Comparison Judging Means 10-11]

The comparison judging means 10-11 creates a word appearance frequency graph 10-10 in which word appearance frequency graphs obtained from information in respective analytic tables 10-7 are superposed based on the plurality of analytic tables 10-7 which are created by analytic table creating means 10-6 and stored in the writing analytic apparatus.

By creating such a word appearance frequency graph 10-10, the above-described impact relationship between a plurality of writings can be grasped.

For example, when there is a common element between writings, it can be considered that graphs completely overlap with each other when they are slightly shifted, thereby grasping a relationship between the writings.

Furthermore, when a given amount or more of words are extracted from respective writings, it can be considered that existence of a common element between these writings can be verified by performing image analysis of the plurality of writings by using the same word list.

Moreover, if many image analysis results are stored with respect to various writings, it can be considered that an author of writings whose author is unknown can become clear by performing analysis of a relationship based on the analytic tables obtained by effecting image analysis with respect to these writings and analytic tables which are stored in analytic results.

Additionally, when the comparison judging means 10-11 is caused to compare respective points or a total point of them in the analytic table 10-7 created based on a plurality of writings and a difference between them falls within a predetermined range, it can be determined that these writings resemble each other or they have a common element. When a difference between these points does not fall within the predetermined range, it can be determined that these writings do not resemble each other or they do not have a common element. Then, the result can be outputted to the word appearance frequency graph 10-10 or the like.

Of course, if these writings are the same, the respective word appearance frequency graphs completely overlap each other and the difference between the points becomes zero. Therefore, it is also possible to judge whether the writings are the same.

It is preferable that the function of the comparison judging means 10-11 can be independently executed by the writing analytic program separately from the analytic table creation function and the like.

As described above, according to the writing analytic apparatus of this embodiment, not only image analysis can be performed with respect to a given writing, but it is also possible to judge whether images included in a plurality of writings resemble each other.

Fifth Embodiment

A fifth embodiment according to the present invention will now be described with reference to FIG. 14. This drawing is a block diagram showing a structure of a writing analytic apparatus according to this embodiment.

This embodiment is different from the fourth embodiment in that the writing analytic apparatus automatically creates a word list. Any other points are the same as those in the fourth embodiment.

Figure 14:
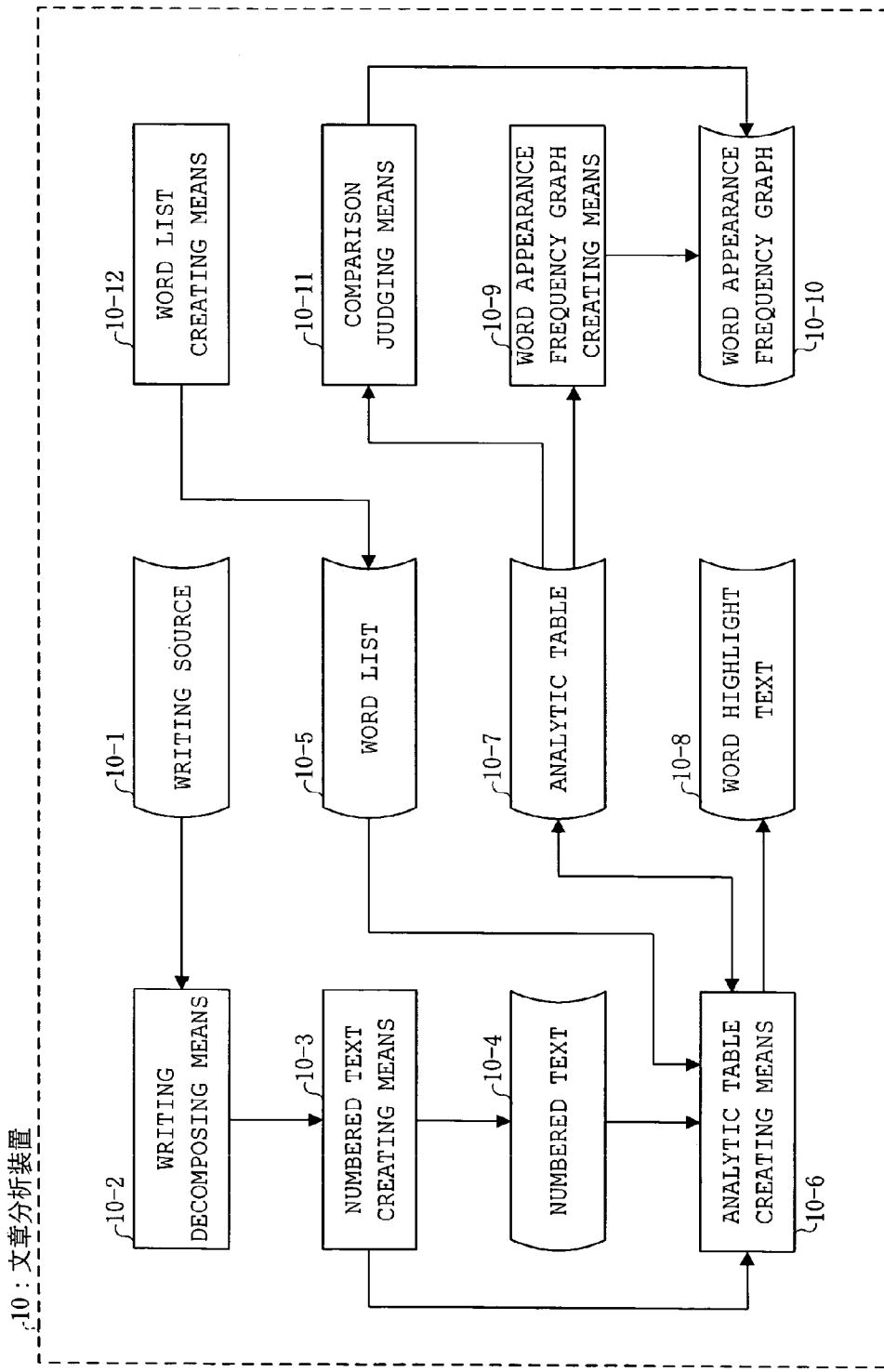
FIG. 14 is a block diagram showing a structure of a writing analytic apparatus according to a fifth embodiment of the present invention.

As shown in FIG. 14, the writing analytic apparatus according to this embodiment has word list creating means 10-12 in addition to the structures in the fourth embodiment.

[Word List Creating Means 10-12]

This word list creating means 10-12 creates a word list 10-5 from dictionary data based on predetermined inputted information.

As this dictionary data, it is possible to use existing data that include various kinds of classification information with respect to each word. For example, when a given word has a meaning which is classified in "plant", this word has information indicative of "plant" as attribute information. Further, in regard to various modification forms such as a plural form, a third person singular present form, an -ing form, a past tense form, a past participle form and others, it is preferable to use forms to which the same classification attribute information as that of the basic form is given. Furthermore, it is also preferable to create a dedicated dictionary satisfying such a criterion and hold it in the writing analytic apparatus.

Moreover, the word list creating means 10-12 inputs the predetermined information and displays a word list creating screen used to accept a request to create the word list.

Then, this means refers to the dictionary data based on a keyword used to extract a word inputted from this word list creating screen, and outputs a hit word to the word list 10-5. At this time, it is also preferable to enable addition of an extracted word in the already created word list 10-5.

It is also desirable that the function of the word list creating means 10-12 can be independently executed by the writing analytic program separately from the analytic table creation function or the like.

As described above, according to the writing analytic apparatus of this embodiment, by inputting a keyword indicative of an image to be analyzed, a word list can be automatically created based on this keyword. Therefore, an operation to create the word list which takes a lot of trouble can be relatively simplified, and image analysis can be readily performed.

Creation of the numbered text, creation of the analytic table or the like in the foregoing embodiment can be executed by the writing analytic program.

The CPU in the writing analytic apparatus supplies commands to respective constituent elements of a computer, and causes them to execute predetermined processing, e.g., numbered text creation processing, analytic table creation processing or the like.

As a result, such processing is realized by the writing analytic apparatus in which the writing analytic program cooperates with the computer.

It is to be noted that the writing analytic program can be stored in an ROM or a hard disk in the computer as well as a computer readable recording medium, e.g., an external storage device, a portable recording medium or the like.

The external storage medium is a storage expanded device which contains a storage medium such as a magnetic disk and is externally connected with the writing analytic apparatus, for example. On the other hand, the portable recording medium is a recording medium which can be attached to a recording medium drive device (drive device) and is portable, for example, a CD-ROM, a flexible disk, a memory card, a magneto optical disk or the like.

Additionally, a program recorded in the recording medium is loaded in an RAM of the computer and executed by the CPU. The function of the writing analytic apparatus according to the foregoing embodiment is realized by this execution.

Further, when loading the writing analytic program by using the computer, a writing analytic program held in another computer can be downloaded in its own RAM or an external storage device by utilizing a communication line.

This downloaded writing analytic program is also executed by the CPU and realizes the numbered text creation processing, the analytic table creation processing or the like according to the foregoing embodiment.

It is to be noted that the present invention is not restricted to the above-described embodiments, and various modifications can be of course carried out within the scope of the invention.

For example, the writing in English has been explained as the analysis target writing in this embodiment, but the present invention can be applied to Japanese or many other languages by using the same method.

Furthermore, it is possible to carry out appropriate modifications with respect to each structure in the writing analytic apparatus within the range which can obtain the advantages of the present invention. For example, creation of the numbered text can be eliminated, and the analytic table showing a word extracted in accordance with each sentence can be created after decomposing a writing.

The writing analytic apparatus according to the present invention can be utilized in analysis of images included in a writing in a literature such as novel or an essay as well as an article in a newspaper or a magazine, a text obtained by converting voice information and others.

Moreover, the writing analytic apparatus according to the present invention can be utilized as a structure which realizes a part of functions in an artificial intelligence.

What is claimed is:

1. A writing analytic apparatus which analyzes an image given to a reader by a writing, comprising:
   a writing source having writing data;
   a word list having one or more sets of word data which represent a predetermined image and specifying words to be extracted from the writing data; and
   writing analyzing means which decomposes a writing in the writing source into a predetermined analysis unit which includes at least one sentence, extracts words existing in the word list from the analysis unit, and creates an analytic table which shows the respective extracted words in accordance with each analysis unit, thereby indicating time-series analysis of an image produced on the reader by the writing,
   wherein the writing analyzing means comprises:
   text creating means which decomposes the writing in the writing source in the predetermined analysis unit, allocates a number in accordance with the analysis unit, and creates a numbered text; and
   analytic table creating means which extracts words existing in the word list from each analysis unit in the numbered text, and creates the analytic table which shows the respective extracted words in accordance with each number, thereby indicating the time-series analysis of the image produced by the writing, and
   wherein the word list has allocated point information of each word, and the analytic table creating means calculates a total point of allocated points of each extracted word in accordance with each number based on the numbered text and the word list and creates the analytic table which shows the total point and each extracted word in accordance with each number or respective analytic tables with respect to words having the same allocated point information; or
   the word list has only words to which the same allocated point should be assigned, and the analytic table creating means creates an analytic table which shows each extracted word in accordance with each number based on the numbered text and the word list, and calculates a total point of allocated points of each extracted word in accordance with each number based on the analytic table and inputted allocated point information of words and creates the analytic table which shows the total point and each extracted word in accordance with each number.

2. The writing analytic apparatus according to claim 1, wherein the word appearance frequency graph creating means creates a word appearance frequency graph which shows the total point in accordance with each number based on the analytic table.

3. A writing analytic program which causes a writing analytic apparatus having a writing source having writing data and a word list having one or more sets of word data representing a predetermined image and specifying words to be extracted from the writing data to analyze an image given to a reader by a writing, wherein the writing analytic apparatus is caused to execute:

decomposing a writing in the writing source in a predetermined analysis unit which includes at least one sentence, extracting words existing in the word list from the analysis unit, and creating an analytic table showing the respective extracted words in accordance with the analysis unit, thereby indicating time-series analysis of the image produced on the reader by the writing, wherein the writing analytic apparatus is caused to execute:

decomposing a writing in the writing source in the predetermined analysis unit, allocating each number in accordance with the analysis unit, and creating a numbered text; and extracting words existing in the word list from each analysis unit in the numbered text, and creating the analytic table showing each extracted word in accordance with each number, thereby indicating the time-series analysis of the image produced on the reader by the writing, wherein, when the word list is assumed to have allocated point information of each word, the writing analytic apparatus is caused to calculate a total point of allocated points of each extracted word in accordance with each number based on the numbered text and the word list, and create the analytic table showing the total point and each extracted word in accordance with each number or respective analytic tables with respect to words having the same allocated point information; or when the word list is assumed to have only words to which the same allocated point should be assigned, the writing analytic apparatus is caused to create the analytic table which shows each extracted word in accordance with each number based on the numbered text and the word list, calculate a total point of allocated points of each extracted word in accordance with each number based on the analytic table and the inputted allocated information of words, and create an analytic table which shows the total point and each extracted word in accordance with each number.

4. The writing analytic program according to claim 3, wherein the writing analytic apparatus is caused to create a word appearance frequency graph which shows the total point in accordance with each number based on the analytic table.

* * * * *